(12) United States Patent
Hu et al.

(10) Patent No.: US 12,330,621 B2
(45) Date of Patent: Jun. 17, 2025

(54) BATTERY ENERGY MANAGEMENT METHOD AND DEVICE FOR HYBRID VEHICLE, AND MACHINE-READABLE STORAGE MEDIUM

(71) Applicant: GREAT WALL MOTOR COMPANY LIMITED, Baoding (CN)

(72) Inventors: Zhimin Hu, Baoding (CN); Bao Liu, Baoding (CN); Wentao Hou, Baoding (CN); Leiguang Tong, Baoding (CN); Guixian Guo, Baoding (CN); Fei Zheng, Baoding (CN)

(73) Assignee: Great Wall Motor Company Limited, Hebei (CN)

( * ) Notice: Subject to any disclaimer, the term of this patent is extended or adjusted under 35 U.S.C. 154(b) by 286 days.

(21) Appl. No.: 18/013,362

(22) PCT Filed: Aug. 19, 2021

(86) PCT No.: PCT/CN2021/113461
§ 371 (c)(1),
(2) Date: Dec. 28, 2022

(87) PCT Pub. No.: WO2022/037632
PCT Pub. Date: Feb. 24, 2022

(65) Prior Publication Data
US 2023/0303056 A1  Sep. 28, 2023

(30) Foreign Application Priority Data
Aug. 19, 2020  (CN) .......................... 202010837547.2

(51) Int. Cl.
*B60W 20/10*  (2016.01)
*B60L 58/12*  (2019.01)

(52) U.S. Cl.
CPC ............. *B60W 20/10* (2013.01); *B60L 58/12* (2019.02)

(58) Field of Classification Search
CPC ........... B60W 20/10; B60W 2510/244; B60W 2710/244; B60W 2556/10;
(Continued)

(56) References Cited

U.S. PATENT DOCUMENTS 10,829,106 B2 * 11/2020 Badger ................. B60W 20/13
2012/0256588 A1  10/2012 Hayashi et al.
(Continued)

FOREIGN PATENT DOCUMENTS

CN  108556839 A  9/2018
CN  111123110 A  5/2020
(Continued)

*Primary Examiner* — Abby J Flynn
*Assistant Examiner* — Kyle J Kingsland
(74) *Attorney, Agent, or Firm* — Boyle Fredrickson, S.C.

(57) ABSTRACT

A battery energy management method comprises: acquiring, for a vehicle usage circulation, a historical cutoff remaining battery capacity value and a historical maximum power demand; predicting a next cutoff remaining battery capacity value according to the historical cutoff remaining battery capacity value; predicting, according to the maximum historical power demand, a lower limit value of a next remaining battery capacity threshold for switching from a power consumption mode to a power maintaining mode; determining the lager value of the predicted next cutoff remaining battery capacity value and the predicted lower limit value of the next remaining battery capacity threshold as a next remaining battery capacity threshold for switching from the power consumption mode to the power maintaining mode; and sending, to the hybrid vehicle, the determined next remaining battery capacity threshold for switching from the power consumption mode to the power maintaining mode.

10 Claims, 3 Drawing Sheets

(58) Field of Classification Search
CPC .. B60W 50/0097; B60W 20/13; B60W 20/00; B60L 58/12; B60L 2260/26; B60L 50/61; B60L 2260/54; B60L 58/13; B60L 58/14
See application file for complete search history.

(56) References Cited

U.S. PATENT DOCUMENTS

2016/0257294 A1* 9/2016 Morisaki ............... B60W 10/08
2016/0272220 A1* 9/2016 Ichikawa ............... B60W 10/06

FOREIGN PATENT DOCUMENTS

| CN | 113173152 A | 7/2021 |
|---|---|---|
| JP | 2010023739 A | 2/2010 |
| KR | 101601222 B1 | 3/2016 |

* cited by examiner

BATTERY ENERGY MANAGEMENT METHOD AND DEVICE FOR HYBRID VEHICLE, AND MACHINE-READABLE STORAGE MEDIUM

CROSS-REFERENCE TO RELATED APPLICATIONS

The present application is a National Phase entry of PCT Application No. PCT/CN2021/113461, filed on Aug. 19, 2021, which claims the priority to Chinese Patent Application No. 202010837547.2, titled "BATTERY ENERGY MANAGEMENT METHOD AND DEVICE FOR HYBRID VEHICLE", filed with the China National Intellectual Property Administration on Aug. 19, 2020, the entire disclosures of which isare incorporated herein by reference.

TECHNICAL FIELD

The present application relates to the technical field of vehicles, and in particular to a battery energy management method and device for a hybrid vehicle.

BACKGROUND OF THE INVENTION

Multiple power sources can be used in a hybrid vehicle, so how to well coordinate the working states of the multiple power sources is a problem.

At present, two management modes for battery energy are used in a battery energy management strategy for a hybrid vehicle, namely: a power consumption mode and a power holding mode. The power consumption mode is used when the remaining state of charge of the battery is high, and the electric energy of the battery in the power consumption mode is consumed as much as possible to reduce the vehicle emissions and improve fuel economy. When the remaining state of charge of the battery drops to a threshold, the vehicle starts to execute the power holding mode, so as to control the remaining state of charge of the battery to remain within a certain range.

In related technology, the remaining state of charge threshold of the battery in the battery energy management strategy is an empirical value, which is a constant value for same type of vehicles. However, due to the differences of usage habits of users, the constant threshold cannot accurately meet the needs of each user.

SUMMARY OF THE INVENTION

In view of this, a battery energy management method and device thereof are provided according to the present application, which are configured to solve the technical problem that the battery energy management cannot accurately meet the needs of each driver in a case that a remaining state of charge threshold for switching from a power consumption mode to a power holding mode is a constant value.

In order to achieve the above object, a technical solution according to the present application is proposed as follows.

A battery energy management method for a hybrid vehicle includes: acquiring, for a vehicle usage circulation, a historical cutoff remaining state of charge value and a historical maximum power demand, in which one vehicle usage circulation is defined as a circulation from a last charging completion to a next charging starting; predicting a next cutoff remaining state of charge value according to the historical cutoff remaining state of charge value; predicting, according to the historical maximum power demand, a lower limit value of a next remaining state of charge threshold for switching from a power consumption mode to a power holding mode; determining a lager one of the predicted next cutoff remaining state of charge value and the lower limit of the remaining state of charge threshold as a next remaining state of charge threshold for switching from the power consumption mode to the power holding mode; and sending, to the hybrid vehicle, the determined next remaining state of charge threshold for switching from the power consumption mode to the power holding mode.

In an embodiment, the acquiring, for a vehicle usage circulation, a historical cutoff remaining state of charge value includes: performing the following steps for each vehicle usage circulation: acquiring a remaining state of charge value when the next charging is started; determining whether the remaining state of charge value when the next charging is started is less than a first preset value, in which the first preset value is a sum of the remaining state of charge threshold for switching from the power consumption mode to the power holding mode in the current vehicle usage circulation and a maximum floating amount of the remaining state of charge value in the power holding mode; determining the remaining state of charge value when the next charging is started as the cutoff remaining state of charge value in a case that the remaining state of charge value when the next charging is started is not less than the first preset value; and calculating, according to a power value of an external work done by a power system after an engine is started in the current vehicle usage circulation, the cutoff remaining state of charge value in a case that the remaining state of charge value when the next charging is started is less than the first preset value.

In an embodiment, the calculating, according to a power value of an external work done by a power system after an engine is started in the current vehicle usage circulation, the cutoff remaining state of charge value includes:

calculating the power value of the external work done by the power system after the engine is started in the current vehicle usage circulation according to the following formula:

$$P1 = \int P dt,$$

in which, $$P = P_{ICE} + P_{motor},$$
$$P_{ICE} = \frac{nT}{9550},$$
$$P_{motor} = UI;$$

calculating the cutoff remaining state of charge value:

$$SOC_C = SOC_T - \frac{\int P dt}{E_{battery}} \times 100\%,$$

in which P1 is the power value of the external work done by the power system after the engine is started in the current vehicle usage circulation, t is time, P is the power value of the external work done by the power system at time t, $P_{ICE}$ is the power value consumed by the engine at time t, n is a rotational speed of the engine at time t, T is a torque output by the engine at time t, $P_{motor}$ is a power value consumed by a motor at time t, U is a voltage at two ends of the motor at time t, I is a current of the motor at time t, $SOC_C$ is the cutoff remaining state of charge value, $SOC_T$ is the remaining state of charge threshold for switching from the power consumption mode to the power holding mode in the current vehicle usage circulation, and $E_{battery}$ is a total energy stored by a battery pack.

In an embodiment, that the calculating, according to a power value of an external work done by a power system after an engine is started in the current vehicle usage circulation, the cutoff remaining state of charge value further includes: determining a larger one between the calculated cutoff remaining state of charge value and a second preset value as a final cutoff remaining state of charge value.

In an embodiment, the predicting a next cutoff remaining state of charge value according to the historical cutoff remaining state of charge value includes: predicting the next cutoff remaining state of charge value according to the following formula:

$$SOC_{C\text{-}new} = \Sigma_{i=1}^{m} k_i SOC_{Ci},$$

in which, $\Sigma_{i=1}^{m} k_i = 1$, in which, $SOC_{C\text{-}new}$ is the next cutoff remaining state of charge value, m is the selected number of the historical cutoff remaining state of charge value, i is a serial number, $SOC_{Ci}$ is the historical cutoff remaining state of charge value for the latest i-th vehicle usage circulation, $k_i$ represents a weighting coefficient corresponding to $SOC_{Ci}$, in which a value of $k_i$ decrease sequentially from i=1 to i=m.

In an embodiment, the predicting, according to the historical maximum power demand, a lower limit value of a next remaining state of charge threshold for switching from a power consumption mode to a power holding mode includes: predicting a next maximum power demand by using the historical maximum power demand; and determining the lower limit value of the remaining state of charge threshold according to the next maximum power demand, and a corresponding relationship between the lower limit value of the remaining state of charge threshold and the power demand.

In an embodiment, the predicting a next maximum power demand by using the historical maximum power demand includes:

calculating the next maximum power demand according to the following formula:

$$P_{Avg} = \sum_{j=1}^{q} w_j P_{reqj}$$

in which, $\Sigma_{i=1}^{m} k_i = 1$, in which, $P_{Avg}$ is the next maximum power demand, q is the selected number of the historical maximum power demand, j is a serial number, $P_{reqj}$ the historical maximum power demand for the latest j-th vehicle usage circulation, $w_j$ represents a weighting coefficient corresponding to $P_{reqj}$, in which a value of $w_j$ decreases sequentially from j=1 to j=m.

In an embodiment, the corresponding relationship between the lower limit value of the remaining state of charge threshold and the power demand includes: a corresponding curve between the lower limit value of the remaining state of charge threshold and the power demand, a corresponding table between the lower limit value of the remaining state of charge threshold and the power demand, or a functional relationship between the lower limit value of the remaining state of charge threshold and the power demand, in which the corresponding curve, the corresponding table or the functional relationship is pre-stored in a server.

In an embodiment, the historical maximum power demand for the vehicle usage circulation is acquired by:
pre-storing a corresponding relationship between the power demand and an accelerator pedal opening;
in each vehicle usage circulation, acquiring a corresponding power demand according to a current accelerator pedal opening and the pre-stored corresponding relationship between the power demand and the accelerator pedal opening, and determining a maximum power demand in the current vehicle usage circulation.

Correspondingly, a battery energy management method for a hybrid vehicle is further provided according to the present application, which includes: receiving the next remaining state of charge threshold for switching from the power consumption mode to the power holding mode determined by a server according to the battery energy management method for the hybrid vehicle as described above; and controlling the switching from the power consumption mode to the power holding mode based on the remaining state of charge threshold.

Correspondingly, a battery energy management device for a hybrid vehicle is further provided according to the present application, which includes: an acquisition module, configured to acquire, for a vehicle usage circulation, a historical cutoff remaining state of charge value and a historical maximum power demand, in which one vehicle usage circulation is from a last charging completion to a next charging starting; a first prediction module, configured to predict a next cutoff remaining state of charge value according to the historical cutoff remaining state of charge value; a second prediction module, configured to predict, according to the historical maximum power demand, a lower limit value of a next remaining state of charge threshold for switching from a power consumption mode to a power holding mode; a determination module, configured to determine a lager one of the predicted next cutoff remaining state of charge value and the lower limit of the remaining state of charge threshold as a next remaining state of charge threshold for switching from the power consumption mode to the power holding mode; and a sending module, configured to send, to the hybrid vehicle, the determined next remaining state of charge threshold for switching from the power consumption mode to the power holding mode.

Correspondingly, a battery energy management device for a hybrid vehicle is further provided according to the present application, which includes: a receiving module, configured to receive the next remaining state of charge threshold for switching from the power consumption mode to the power holding mode determined by a server according to the above battery energy management method for the hybrid vehicle; and a control module, configured to control the switching from the power consumption mode to the power holding mode based on the remaining state of charge threshold.

Compared with the conventional technology, the battery energy management method and device for the hybrid vehicle have the following advantages.

The historical cutoff remaining state of charge value and the historical maximum power demand for the vehicle usage circulation of the user are acquired, and the next remaining state of charge threshold for switching from the power consumption mode to the power holding mode is determined based on the historical cutoff remaining state of charge value and the historical maximum power demand. In view of this, the remaining state of charge threshold can be dynamically changed according to different historical usage data of the user, so that the battery energy management for the hybrid vehicle is more suitable for needs of the user.

In an embodiment, the receiving module includes a vehicle networking module which is arranged inside the hybrid vehicle, and the server is in communication with the hybrid vehicle through the vehicle networking module.

In an embodiment, the vehicle networking module includes a data routing function and a data storage function, the data routing function is configured to convert between an in-vehicle communication protocol and a remote communication protocol; and the data storage function is configured to store an operation data of the vehicle when the communication between the vehicle and the server is unavailable.

In addition, a machine-readable storage medium is further provided according to the present application, the machine-readable storage medium stores instructions for performing: the battery energy management method for the hybrid vehicle according to any one of the above.

The machine-readable storage medium according to the present application includes the battery energy management method for the hybrid vehicle, so that the machine-readable storage medium has the above technical effects of the battery energy management method for the hybrid vehicle.

Other features and advantages of the present disclosure are described in detail in the following specific embodiments.

BRIEF DESCRIPTION OF THE DRAWINGS

The accompanying drawings forming a part of the present application are used to provide a further understanding of the present application. Exemplary embodiments of the present application and descriptions thereof are used to explain the present application rather than constitute an undue limitation on the present application. In the drawings.

DETAILED DESCRIPTION OF THE PREFERRED EMBODIMENTS

It should be noted that embodiments of the present application and features in the embodiments may be in combination with each other as long as there is no conflict.

The present application is described in detail below with reference to the drawings and in conjunction with the embodiments.

A remaining state of charge threshold of a battery for switching from a power consumption mode to a power holding mode in the vehicle is an important parameter for mode switching. If a high remaining state of charge threshold is set, the vehicle cannot make full use of the battery power to drive the vehicle, since the power holding mode lasts for a long time, the engine works for a long time, and the fuel consumption increases and the emissions become worse in this case. If a low remaining state of charge threshold of the battery is set, the power performance in power holding mode becomes worse. Therefore, the engine and the motor need to be output together when the user needs more power. The lower the battery power is, the lower its discharge power is, and the motor power may become weaker, so the power performance of the vehicle may become worse.

In related technology, the remaining state of charge threshold of the battery for switching from the power consumption mode to the power holding mode is an empirical value, which is a constant value for same type of vehicles. However, due to the differences of usage habits of users, the constant threshold cannot accurately meet the needs of each user. However, due to the differences of usage habits of users, the constant threshold cannot accurately meet the needs of each user. For example, if the pure electric endurance of the hybrid vehicle is 50 km and the commute distance of the user is 40 km, 80% of the electricity can meet the commute needs of the user after the vehicle is fully charged every day. However, if the remaining state of charge threshold of the battery for switching from the power consumption mode to the power holding mode in the electric energy management strategy is defined to be 25%, the engine is started when the user is on the way to work. Apparently, this increases the car costs of the user, because the cost of oil is much higher than the cost of electricity. Based on this, a battery energy management method and device for a hybrid vehicle is provided according to the present application, so that the remaining state of charge threshold of the battery can be dynamically changed according to different user historical usage data.

Figure 1:
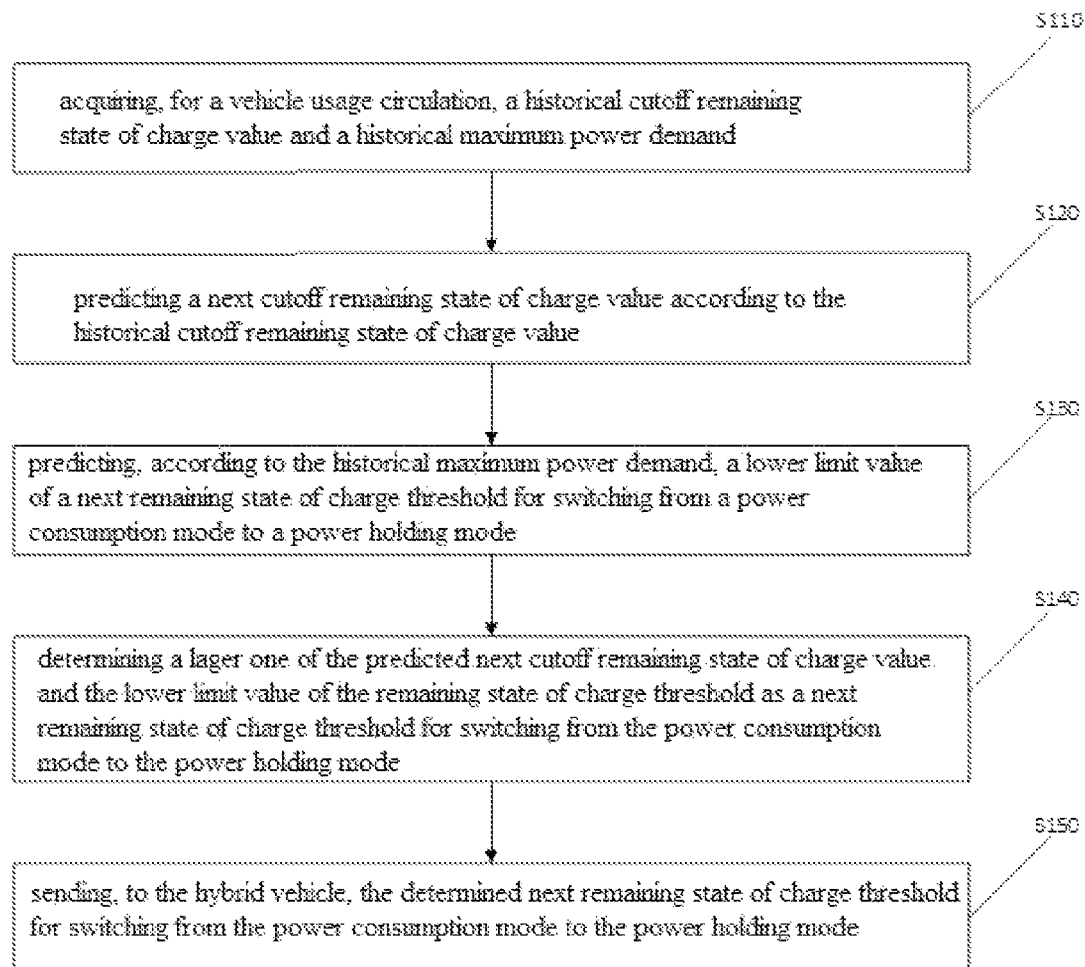
FIG. 1 is a schematic flowchart showing a battery energy management method for a hybrid vehicle according to an embodiment of the present application.

FIG. 1 is a schematic flowchart showing a battery energy management method for a hybrid vehicle according to an embodiment of the present application. As shown in FIG. 1, a battery energy management method for a hybrid vehicle is provided according to the present application, and the method is executed by a server. The server can communicate with a vehicle networking module of the hybrid vehicle, and acquire the data of the hybrid vehicle through the vehicle networking module, or send data to the hybrid vehicle through the vehicle networking module. The method includes step S110 to step S140.

In step S110, acquiring, for a vehicle usage circulation, a historical cutoff remaining state of charge value and a historical maximum power demand.

In the present application, one vehicle usage circulation is a circulation from a last charging completion to a next charging starting.

First, how to acquire the historical cutoff remaining state of charge value $SOC_C$ is described. In the present application, the cutoff remaining state of charge value is a theoretical remaining state of charge value of the battery without considering the case that the engine charges the battery after the vehicle usage circulation ends.

For any vehicle usage circulation, the server can obtain the remaining state of charge value $SOC_C$ when recharging at the end of the current vehicle usage circulation from the data transmitted by the vehicle networking module.

Whether the remaining state of charge value when the next charging is started is less than a first preset value is determined. The first preset value is a sum of the remaining state of charge threshold $SOC_T$ for switching from the power consumption mode to the power holding mode in the current vehicle usage circulation and a maximum floating amount $SOC_S$ of the remaining state of charge value in the power holding mode, that is, the first preset value=$SOC_T$+$SOC_S$.

It means that the battery energy has been used in the vehicle usage circulation as the power and the engine is not started if the remaining state of charge value when the next charging is started is not less than the first preset value. In this case, the remaining state of charge value when the next charging is started is determined as the cutoff remaining state of charge value $SOC_C$.

It means that the engine has been started during the vehicle usage circulation if the remaining state of charge value when the next charging is started is less than the first preset value. In this case, the cutoff remaining state of charge value $SOC_C$ needs to be calculated according to the operation data of the vehicle, specifically according to a power value of an external work done by a power system after the engine is started.

At any time t, that the power value P1 of the external work done by the power system after the engine is started includes the power value $P_{ICE}$ consumed by the engine at time t and the power value $P_{motor}$ consumed by the motor at time t.

Specifically, $P_{ICE}$ and $P_{motor}$ are calculated based on the following equation.

$$P_{ICE} = \frac{nT}{9550} \quad (1)$$

$$P_{motor} = UI \quad (2)$$

then, $$P = P_{ICE} + P_{motor} \quad (3)$$

Then, the cutoff remaining state of charge value $SOC_C$ is calculated according to the power value P1 of the external work done by the power system after the engine is started at any time t, specifically according to the following formula:

$$SOC_C = SOC_T - \frac{\int Pdt}{E_{battery}} \times 100\% \quad (4)$$

$SOC_T$ is the remaining state of charge threshold for switching from the power consumption mode to the power holding mode in the current vehicle usage circulation, and $E_{battery}$ is a total energy stored by a battery pack.

In an embodiment, the value calculated by formula (4) can be used as the final cutoff remaining state of charge value if the remaining state of charge value when the next charging is started is less than the first preset value.

In another embodiment, when the vehicle is in the power holding mode for a long time, the value of $SOC_C$ calculated according to formula (4) may be very small, even less than 0. In actual use, it is ensured that the battery pack is not less than a second preset value, so as not to affect the normal use of the vehicle. The second preset value can be acquired through calibration, for example, the second preset value can be set to be 15%, but it can be understood that 15% is only used for example, not for limitation. Therefore, in this embodiment, a larger one of the cutoff remaining state of charge value calculated according to the formula (4) and the second preset value may be used as the final cutoff remaining state of charge value.

Figure 2:
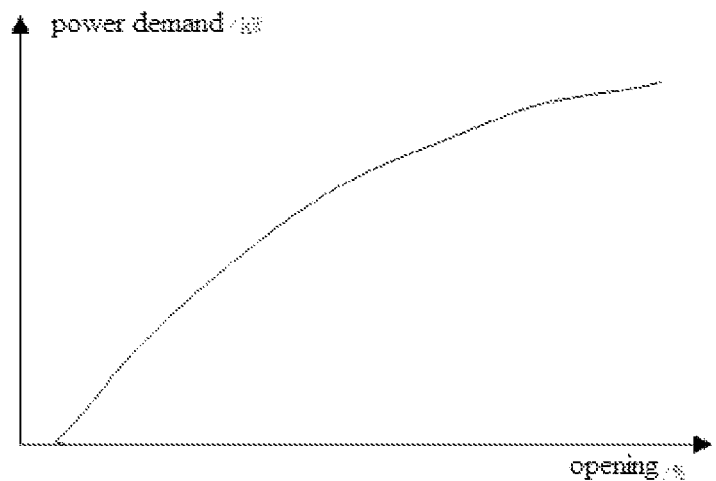
FIG. 2 is a schematic view showing a corresponding curve between a power demand and an accelerator pedal opening.

The acquisition of the historical maximum power demand for the vehicle usage circulation is described below. The power demand is related to an accelerator pedal opening. For each vehicle, a corresponding relationship between the power demand and the accelerator pedal opening can be acquired by pre-testing. The server may pre-store the corresponding relationship between the power demand and the accelerator pedal opening. The corresponding relationship, for example, may be a corresponding curve between the power demand and the accelerator pedal opening, as shown in FIG. 2, or a corresponding table between the power demand and the accelerator pedal opening, or a functional relationship between the power demand and the accelerator pedal opening.

The vehicle can transmit the accelerator pedal opening to the server in real time. In each vehicle usage circulation, the server acquires the corresponding power demand according to the accelerator pedal opening, and determines the maximum power demand for the vehicle usage circulation.

In step S120, predicting a next cutoff remaining state of charge value according to the historical cutoff remaining state of charge value.

Specifically, the next cutoff remaining state of charge value is predicted by using the weighted average method according to the following formula:

$$SOC_{C\text{-}new} = \Sigma_{i=1}^{m} k_i SOC_{Ci} \quad (4)$$

in which, $\Sigma_{i=1}^{m} k_i = 1$, in which, $SOC_{C\text{-}new}$ is the next cutoff remaining state of charge value, m is the selected number of the historical cutoff remaining state of charge value, i is a serial number, $SOC_{Ci}$ is the historical cutoff remaining state of charge value for the latest i-th vehicle usage circulation, $k_i$ represents a weighting coefficient corresponding to $SOC_{Ci}$, in which a value of $k_i$ decrease sequentially from i=1 to i=m. The value of $k_i$ can selected as any value that satisfies the conditions. The selected historical cutoff remaining state of charge value may be values for the latest m vehicle usage circulations.

The selected number of the historical cutoff remaining state of charge value can be set to any suitable value according to actual needs. Taking m=6 as an example, the next cutoff remaining state of charge value can be predicted as:

$$SOC_{C\text{-}new} = k_1 SOC_{C1} + k_2 SOC_{C2} + k_3 SOC_{C3} + k_4 SOC_{C4} + k_5 SOC_{C5} + k_6 SOC_{C6} \quad (5)$$

in which, $k_1 + k_2 + k_3 + k_4 + k_5 + k_6 = 1$, and $k_1 > k_2 > k_3 > k_4 > k_5 > k_6$. In which, the value of $k_1$ to $k_6$ can be selected as any value that satisfies the above two conditions.

In the present application, m=6 is only used as an example, not as a limitation. m can be set to any suitable value as required.

In step S130, predicting, according to the historical maximum power demand, a lower limit value of a next remaining state of charge threshold for switching from a power consumption mode to a power holding mode.

Specifically, first a next maximum power demand is predicted by using the historical maximum power demand.

The next maximum power demand can be predicted by using the weighted average method according to the following formula:

$$P_{Avg} = \sum_{i=1}^{q} w_j P_{reqj} \quad (6)$$

in which, $\Sigma_{i=1}^{m} k_i=1$, in which, $P_{Avg}$ is the next maximum power demand, q is the selected number of the historical maximum power demand, j is a serial number, $P_{regj}$ the historical maximum power demand for the latest j-th vehicle usage circulation, $w_j$ represents a weighting coefficient corresponding to $P_{regj}$, in which a value of $w_j$ decreases sequentially from j=1 to j=m. The selected historical maximum power demand may be values for the latest q vehicle usage circulations.

The selected number of the historical maximum power demand can be set to any suitable value according to actual needs. Taking q=6 as an example, the next historical maximum power demand can be predicted as:

$$P_{Avg}=w_1 P_{reg1}+w_2 P_{reg2}+w_3 P_{reg3}+w_4 P_{reg4}+w_5 P_{reg5}+w_6 P_{reg6} \quad (7)$$

in which, $w_1+w_2+w_3+w_4+w_5+w_6=1$, and $w_1>w_2>w_3>w_4>w_5>w_6$. The value of $w_1$ to $w_6$ can be selected as any value that satisfies the above two conditions.

After the next maximum power demand is predicted, the lower limit value $SOC_{Tmin}$ of the next remaining state of charge threshold for switching from the power consumption mode to the power holding mode is determined according to the next maximum power demand, and, a corresponding relationship between the lower limit value of the remaining state of charge threshold and the power demand.

Figure 3:
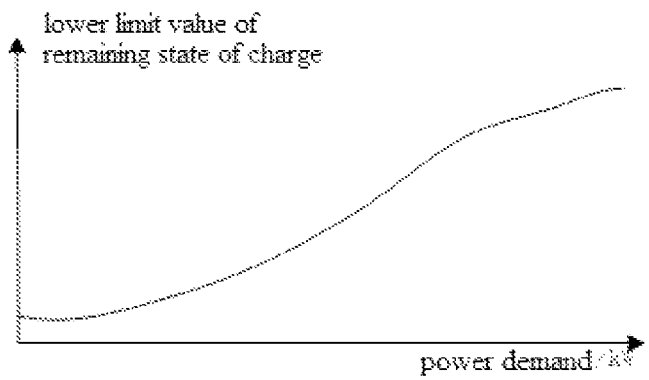
FIG. 3 is a schematic view showing a corresponding curve between a lower limit value of a remaining state of charge threshold and the power demand.

For each vehicle, the corresponding relationship between the lower limit value of the remaining state of charge threshold and the power demand can be acquired by pre-testing. The server may pre-store the corresponding relationship between the lower limit value of the remaining state of charge threshold and the power demand. The corresponding relationship, for example, may be a corresponding curve between the lower limit value of the remaining state of charge threshold and the power demand, as shown in FIG. 3, or a corresponding table between the lower limit value of the remaining state of charge threshold and the power demand, or a functional relationship between the lower limit value of the remaining state of charge threshold and the power demand.

In step S140, determining a lager one of the predicted next cutoff remaining state of charge value and the lower limit of the remaining state of charge threshold as a next remaining state of charge threshold for switching from the power consumption mode to the power holding mode.

That is, $SOC_T=\max(SOC_{C-new}, SOC_{Tmin})$, in which $SOC_T$ is the next remaining state of charge threshold for switching from the power consumption mode to the power holding mode.

In step S150, sending, to the hybrid vehicle, the determined next remaining state of charge threshold for switching from the power consumption mode to the power holding mode.

After the vehicle receives the remaining state of charge threshold, the switching from the power consumption mode to the power holding mode can be controlled according to the threshold. Through the battery energy management method for the hybrid vehicle according to the present application, the remaining state of charge threshold can be dynamically changed according to different historical usage data of the user, so that the battery energy management for the hybrid vehicle is more suitable for needs of the user.

Figure 4:
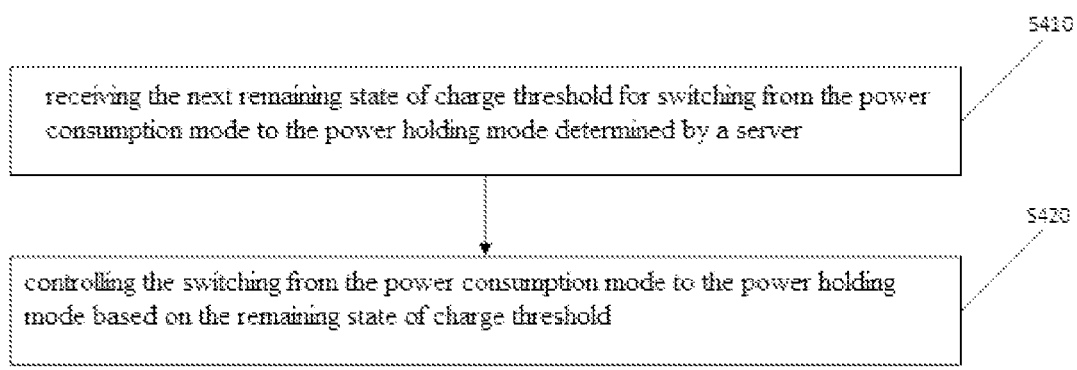
FIG. 4 is a schematic flowchart showing the battery energy management method for the hybrid vehicle according to another embodiment of the present application.

FIG. 4 is a schematic flowchart showing the battery energy management method for the hybrid vehicle according to another embodiment of the present application. As shown in FIG. 4, a power distribution management method for a hybrid vehicle is further provided according to the present application, the method can be executed by a vehicle controller of the hybrid vehicle, and the hybrid vehicle can communicate with the server through the vehicle networking module. The method includes step S410 to step S420.

In step S410, receiving the next remaining state of charge threshold for switching from the power consumption mode to the power holding mode.

After the server determines the next remaining state of charge threshold for switching from the power consumption mode to the power holding mode, the server can send the next remaining state of charge threshold to the vehicle networking module of the hybrid vehicle. The vehicle networking module can send the next remaining state of charge threshold to the vehicle controller.

In step S420, controlling the switching from the power consumption mode to the power holding mode based on the remaining state of charge threshold.

The vehicle controller can monitor the remaining state of charge of the battery in real time, and control the hybrid vehicle to switch from the power consumption mode to the power holding mode in a case that the remaining state of charge reaches the remaining state of charge threshold. Through the battery energy management method for the hybrid vehicle according to the present application, the remaining state of charge threshold can be dynamically changed according to different historical usage data of the user, so that the battery energy management for the hybrid vehicle is more suitable for needs of the user.

Figure 5:
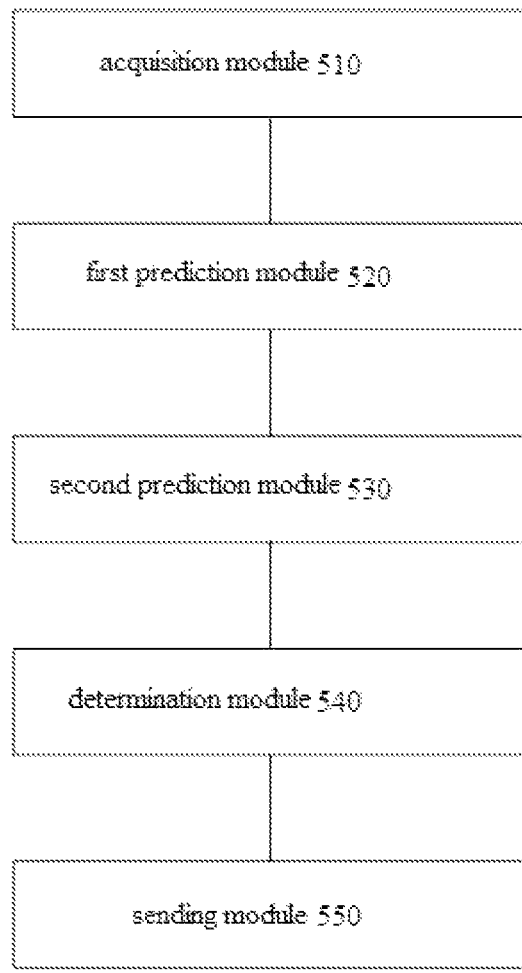
FIG. 5 is a structural block diagram showing a battery energy management device for a hybrid vehicle according to an embodiment of the present application.

FIG. 5 is a structural block diagram showing a battery energy management device for a hybrid vehicle according to an embodiment of the present application. As shown in FIG. 5, a power distribution management device for a hybrid vehicle is provided according to the present application, and the device is applicable to the server. The device includes: an acquisition module 510, configured to acquire, for a vehicle usage circulation, a historical cutoff remaining state of charge value and a historical maximum power demand, in which one vehicle usage circulation is from a last charging completion to a next charging starting; a first prediction module 520, configured to predict a next cutoff remaining state of charge value according to the historical cutoff remaining state of charge value; a second prediction module 530, configured to predict, according to the historical maximum power demand, a lower limit value of a next remaining state of charge threshold for switching from a power consumption mode to a power holding mode; a determination module 540, configured to determine a lager one of the predicted next cutoff remaining state of charge value and the lower limit of the remaining state of charge threshold as a next remaining state of charge threshold for switching from the power consumption mode to the power holding mode; and a sending module 550, configured to send, to the hybrid vehicle, the determined next remaining state of charge threshold for switching from the power consumption mode to the power holding mode.

The historical cutoff remaining state of charge value and the historical maximum power demand for the vehicle usage circulation of the user are acquired, and the next remaining state of charge threshold for switching from the power consumption mode to the power holding mode is determined based on the historical cutoff remaining state of charge value and the historical maximum power demand. In view of this, the remaining state of charge threshold can be dynamically changed according to different historical usage data of the user, so that the battery energy management for the hybrid vehicle is more suitable for needs of the user.

The specific working principles and benefits of the power distribution management device for the hybrid vehicle according to the present application are the same as those of the power distribution management method for the hybrid vehicle executed by the server provided in the present application, and are not described here.

Figure 6:
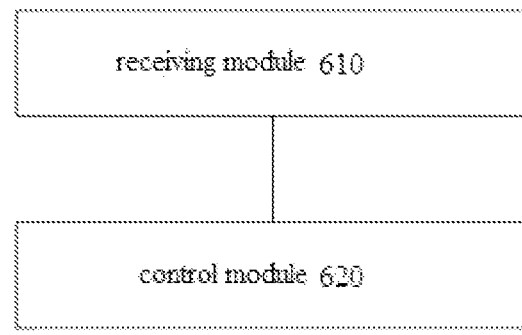
FIG. 6 is a structural block diagram showing a battery energy management device for a hybrid vehicle according to another embodiment of the present application.

FIG. 6 is a structural block diagram showing a battery energy management device for a hybrid vehicle according to another embodiment of the present application. As shower in FIG. 6, a battery energy management device for a hybrid vehicle is further provided according to an embodiment of the present application, and the device can be used for the hybrid vehicle. The device includes: a receiving module 610, configured to receive the next remaining state of charge threshold for switching from the power consumption mode to the power holding mode; and a control module 620, configured to control the switching from the power consumption mode to the power holding mode based on the remaining state of charge threshold.

The historical cutoff remaining state of charge value and the historical maximum power demand for the vehicle usage circulation of the user are acquired, and the next remaining state of charge threshold for switching from the power consumption mode to the power holding mode is determined based on the historical cutoff remaining state of charge value and the historical maximum power demand. In view of this, the remaining state of charge threshold can be dynamically changed according to different historical usage data of the user, so that the battery energy management for the hybrid vehicle is more suitable for needs of the user.

The specific working principles and benefits of the battery energy management device for the hybrid vehicle according to the present application are the same as those of the battery energy management method for the hybrid vehicle executed by the hybrid vehicle according to the present application, which are not described here.

The server according to the present application can communicate with the hybrid vehicle through the vehicle networking module arranged on the hybrid vehicle.

The server can specifically perform data analysis, data cleaning, data storage, data operation, and data conversion. The data uploaded from the hybrid vehicle to a cloud platform needs to be converted into a form that can be used for calculation, and this process is data analysis. The hybrid vehicle continues to upload data to the server when it wakes up. When the vehicle is in normal use, actions for non-driving and charging, such as opening and closing vehicle door, remote inquiring the vehicle conditions, may also wake up the vehicle. Therefore, the hybrid vehicle uploads many invalid data. Therefore, it is necessary to clean the data to remove invalid data, for example, when the method described according to the present application is executed, only the data related to the analysis of the driving habits and charging habits of the user can be kept. The server can uniformly store the sorted data to the database which is arranged according to time for calling the data in each time period. The method according to the present application can be a specific process of performing data operation. The calculation results are converted into CAN messages and sent to the hybrid vehicle before the calculation results are sent to the hybrid vehicle.

The vehicle networking module is arranged inside the vehicle, and is wirelessly connected with the server through the network connection protocol. The vehicle networking module can perform two functions: data routing and data storage. When the data routing is performed, the vehicle networking module can convert between an in-vehicle communication protocol to a remote communication protocol. The communication between the vehicle and the server may be interrupted because the vehicle is often parked in the underground parking garage and other places with poor signals. A storage module is added to the vehicle networking module to store the operation data of the vehicle when it cannot communicate with the server, and the operation data is packaged and uploaded as a whole after reconnection.

A charger of the vehicle can send whether the vehicle is currently in a charging state to the server through the vehicle networking module, and the battery management system can send the actual remaining state of charge value to the server through the vehicle networking module. A transmitter can send whether the vehicle is currently in operation state and a speed torque to the server through the vehicle networking module. The motor can send a voltage value and a current value to the server through the vehicle networking module. The vehicle controller can receive the next remaining state of charge threshold, sent by the server through the vehicle networking module, for switching from the power consumption mode to the power holding mode, and control the switching from the power consumption mode to the power holding mode based on the remaining state of charge threshold.

Correspondingly, a machine-readable storage medium is provided according to the present application, which stores instructions for causing a machine to perform the power distribution management method for the hybrid vehicle according to any embodiment of the present application. The machine-readable control medium includes, but is not limited to, various mediums that are capable of storing a program code, such as a phase change memory (PRAM), a static random access memory (SRAM), a dynamic random access memory (DRAM), other random access memory (RAM), a read-only memory (ROM), an electrically erasable programmable read only memory (EEPROM), a flash memory or other memory, a CD-ROM read-only memory (CD-ROM), a digital versatile disc (DVD) or other optical storage, a magnetic cassette tape, a magnetic tape disk storage or other magnetic storage devices.

The above description shows only preferred embodiments of the present application and is not intended to limit the present application. Any modification, equivalent replacement and improvement made within the spirit and principle of the present application shall fall within the protection scope of the present application.

What is claimed is:

1. A battery energy management method for a hybrid vehicle, comprising:
   acquiring, for a vehicle usage circulation, a historical cutoff remaining state of charge value and a historical maximum power demand, wherein one vehicle usage circulation is a circulation from a last charging completion to a next charging starting;
   predicting a next cutoff remaining state of charge value according to the historical cutoff remaining state of charge value;
   predicting, according to the historical maximum power demand, a lower limit value of a next remaining state of charge threshold for switching from a power consumption mode to a power holding mode;
   determining a larger one of the predicted next cutoff remaining state of charge value and the lower limit value of the remaining state of charge threshold as a next remaining state of charge threshold for switching from the power consumption mode to the power holding mode;

sending, to the hybrid vehicle, the determined next remaining state of charge threshold for switching from the power consumption mode to the power holding mode;

receiving the next remaining state of charge threshold for switching from the power consumption mode to the power holding mode determined by a server; and controlling the switching from the power consumption mode to the power holding mode based on the next remaining state of charge threshold.

2. The battery energy management method for the hybrid vehicle according to claim 1, wherein the acquiring, for a vehicle usage circulation, a historical cutoff remaining state of charge value comprises: performing the following steps for each vehicle usage circulation:

acquiring a remaining state of charge value when the next charging is started;

determining whether the remaining state of charge value when the next charging is started is less than a first preset value, wherein the first preset value is a sum of the remaining state of charge threshold for switching from the power consumption mode to the power holding mode in the current vehicle usage circulation and a maximum floating amount of the remaining state of charge value in the power holding mode;

determining the remaining state of charge value when the next charging is started as the cutoff remaining state of charge value in a case that the remaining state of charge value when the next charging is started is not less than the first preset value; and calculating, according to a power value of an external work done by a power system after an engine is started in the current vehicle usage circulation, the cutoff remaining state of charge value in a case that the remaining state of charge value when the next charging is started is less than the first preset value.

3. The battery energy management method for the hybrid vehicle according to claim 2, wherein that the calculating, according to a power value of an external work done by a power system after an engine is started in the current vehicle usage circulation, the cutoff remaining state of charge value comprises:

calculating the power value of the external work done by the power system after the engine is started in the current vehicle usage circulation according to the following formula:

$$P1 = \int P dt,$$

wherein, $$P = P_{ICE} + P_{motor},$$
$$P_{ICE} = \frac{nT}{9550},$$
$$P_{motor} = UI;$$

calculating the cutoff remaining state of charge value:

$$SOC_C = SOC_T - \frac{\int P dt}{E_{battery}} \times 100\%,$$

wherein P1 is the power value of the external work done by the power system after the engine is started in the current vehicle usage circulation, t is time, P is the power value of the external work done by the power system at time t, $P_{ICE}$ is the power value consumed by the engine at time t, n is a rotational speed of the engine at time t, T is a torque output by the engine at time t, $P_{motor}$ is a power value consumed by a motor at time t, U is a voltage at two ends of the motor at time t, I is a current of the motor at time t, $SOC_C$ is the cutoff remaining state of charge value, $SOC_T$ is the remaining state of charge threshold for switching from the power consumption mode to the power holding mode in the current vehicle usage circulation, and $E_{battery}$ is a total energy stored by a battery pack.

4. The battery energy management method for the hybrid vehicle according to claim 3, wherein the calculating, according to a power value of an external work done by a power system after an engine is started in the current vehicle usage circulation, the cutoff remaining state of charge value further comprises:

determining a larger one between the calculated cutoff remaining state of charge value and a second preset value as a final cutoff remaining state of charge value.

5. The battery energy management method according to claim 1, wherein the predicting a next cutoff remaining state of charge value according to the historical cutoff remaining state of charge value comprises:

predicting the next cutoff remaining state of charge value according to the following formula:

$$SOC_{C\text{-}new} = \sum_{i=1}^{m} k_i SOC_{Ci},$$

wherein, $\sum_{i=1}^{m} k_i = 1$, wherein, $SOC_{C\text{-}new}$ is the next cutoff remaining state of charge value, m is the selected number of the historical cutoff remaining state of charge value, i is a serial number, $SOC_{Ci}$ is the historical cutoff remaining state of charge value for the latest i-th vehicle usage circulation, $k_i$ represents a weighting coefficient corresponding to $SOC_{Ci}$, wherein a value of $k_i$ decrease sequentially from i=1 to i=m.

6. The battery energy management method for the hybrid vehicle according to claim 1, wherein the predicting, according to the historical maximum power demand, a lower limit value of a next remaining state of charge threshold for switching from a power consumption mode to a power holding mode comprises:

predicting a next maximum power demand by using the historical maximum power demand; and determining the lower limit value of the remaining state of charge threshold according to the next maximum power demand, and a corresponding relationship between the lower limit value of the remaining state of charge threshold and the power demand.

7. The battery energy management method according to claim 6, wherein the predicting a next maximum power demand by using the historical maximum power demand comprises:

calculating the next maximum power demand according to the following formula:

$$P_{Avg} = \sum_{i=1}^{q} w_j P_{reqj}$$

wherein, $\sum_{i=1}^{m} k_i = 1$, wherein, $P_{Avg}$ is the next maximum power demand, q is the selected number of the historical maximum power demand, j is a serial number, $P_{regj}$ the historical maximum power demand for the latest j-th vehicle usage circulation, $w_j$ represents a weighting coefficient corresponding to $P_{regj}$, wherein a value of $w_j$ decreases sequentially from j=1 to j=m.

8. The battery energy management method according to claim 6, wherein the corresponding relationship between the lower limit value of the remaining state of charge threshold and the power demand comprises: a corresponding curve between the lower limit value of the remaining state of charge threshold and the power demand, a corresponding table between the lower limit value of the remaining state of charge threshold and the power demand, or a functional relationship between the lower limit value of the remaining state of charge threshold and the power demand, wherein the corresponding curve, the corresponding table or the functional relationship is pre-stored in a server.

9. The battery energy management method according to claim 1, wherein the historical maximum power demand for the vehicle usage circulation is acquired by:
  pre-storing a corresponding relationship between the power demand and an accelerator pedal opening;
  in each vehicle usage circulation, acquiring a corresponding power demand according to a current accelerator pedal opening and the pre-stored corresponding relationship between the power demand and the accelerator pedal opening, and determining a maximum power demand in the current vehicle usage circulation.

10. A non-transitory machine-readable storage medium, wherein the non-transitory machine-readable storage medium stores instructions executable by a processor for performing the battery energy management method for the hybrid vehicle according to claim 1.

* * * * *